United States Patent [19]

O'Mahony

[11] 4,260,944

[45] Apr. 7, 1981

[54] PULSATING SIGNAL GENERATOR FOR THE PRODUCTION OF POLYPHASE VOLTAGES OF INTERFERENCE

[76] Inventor: Gérard O'Mahony, 95 rue de Versailles, 92410 Ville d'Avray, France

[21] Appl. No.: 33,955

[22] Filed: Apr. 27, 1979

[30] Foreign Application Priority Data

Apr. 28, 1978 [FR] France ............................ 78 12836

[51] Int. Cl.³ .............................................. H02K 39/00
[52] U.S. Cl. .................................... 322/48; 310/111; 310/168
[58] Field of Search ..................... 322/48, 32; 310/111, 310/178, 169, 170, 168, 171, 75.12, 159, 160

[56] References Cited

U.S. PATENT DOCUMENTS

| | | | |
|---|---|---|---|
| 3,303,369 | 2/1967 | Erickson | 310/168 |
| 3,309,547 | 3/1967 | Woodward, Jr. | 310/168 |
| 3,319,100 | 5/1967 | Erickson | 310/168 |
| 3,321,652 | 5/1967 | Opel | 310/168 |
| 3,571,639 | 3/1971 | Tiltins | 310/168 |

*Primary Examiner*—Robert J. Hickey

*Attorney, Agent, or Firm*—Burns, Doane, Swecker & Mathis

[57] ABSTRACT

A pulsating signal generator for the production, in particular, of 3 systems of triphase voltages, in which the resulting pseudo-sinusoidal voltages of the 3 systems are modulated in amplitude at predetermined, fixed or variable pulsation $\epsilon$, and staggered in phase by $2\pi/3$ radians among themselves. The generators of the double homopolar rotating machine type comprise a magnetic stator circuit of double homopolar alternator construction provided with two armatures, each including a system of triphase windings with 3 independent circuits per phase, each circuit of each phase of the first armature being connected in series with one of the circuits of a phase of the second armature. A rotor with a rotating magnet divided into two half-rotors by an airgap 23 is disposed on a shaft concentric with the armatures and an excitation induction coil, concentric to the axis of the rotor provides magnetic flux through the armatures. A driving means drives the half-rotors at speeds $\mu_1$, and $\mu_2$ different one from the other and which are such that the half-difference of the speeds $(\mu_1-\mu_2/2)$ is equal to $\epsilon$. The generation of triphase pseudo-sinusoidal voltages of a given pulsation $\epsilon$ from machines rotating at a speed much higher than $\epsilon$ is thus realized.

12 Claims, 15 Drawing Figures

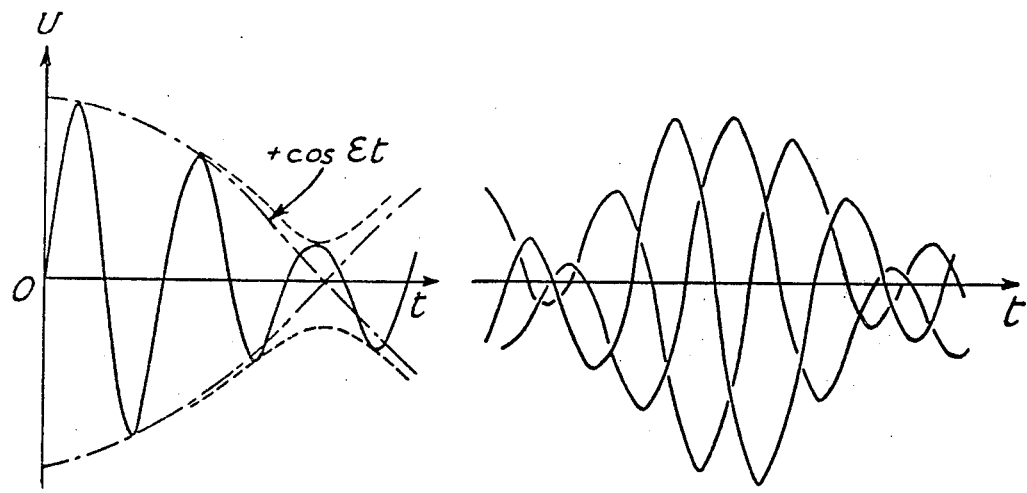
Fig. 1  Fig. 2
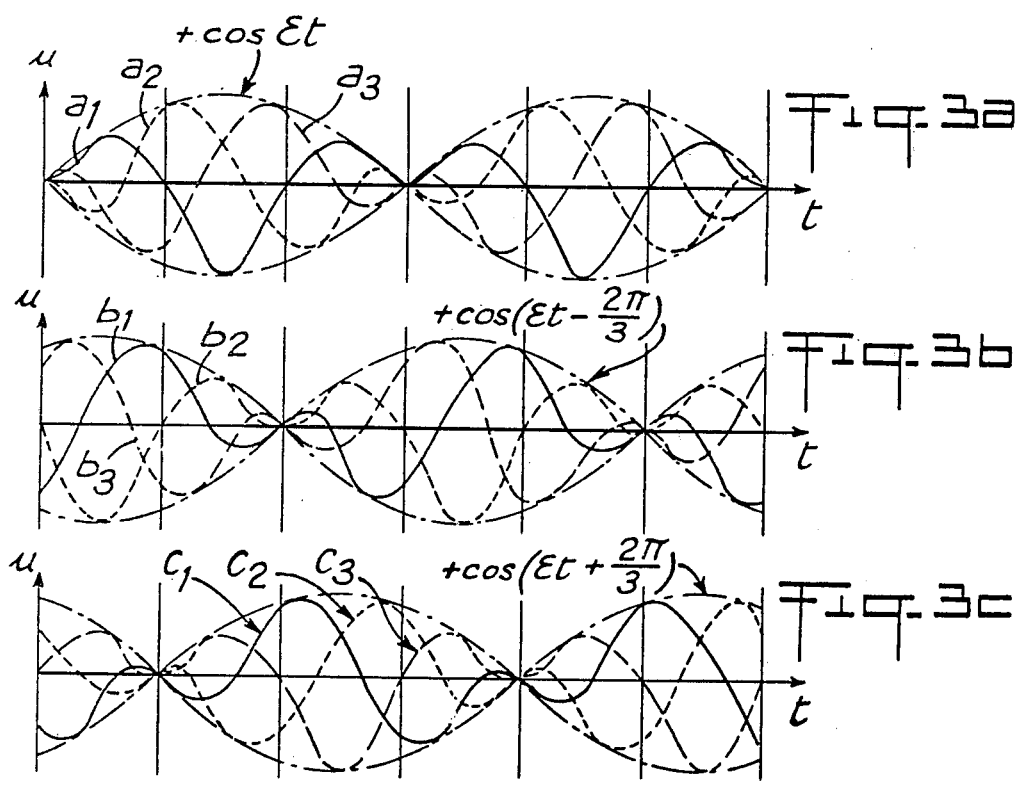
Fig. 3a
Fig. 3b
Fig. 3c

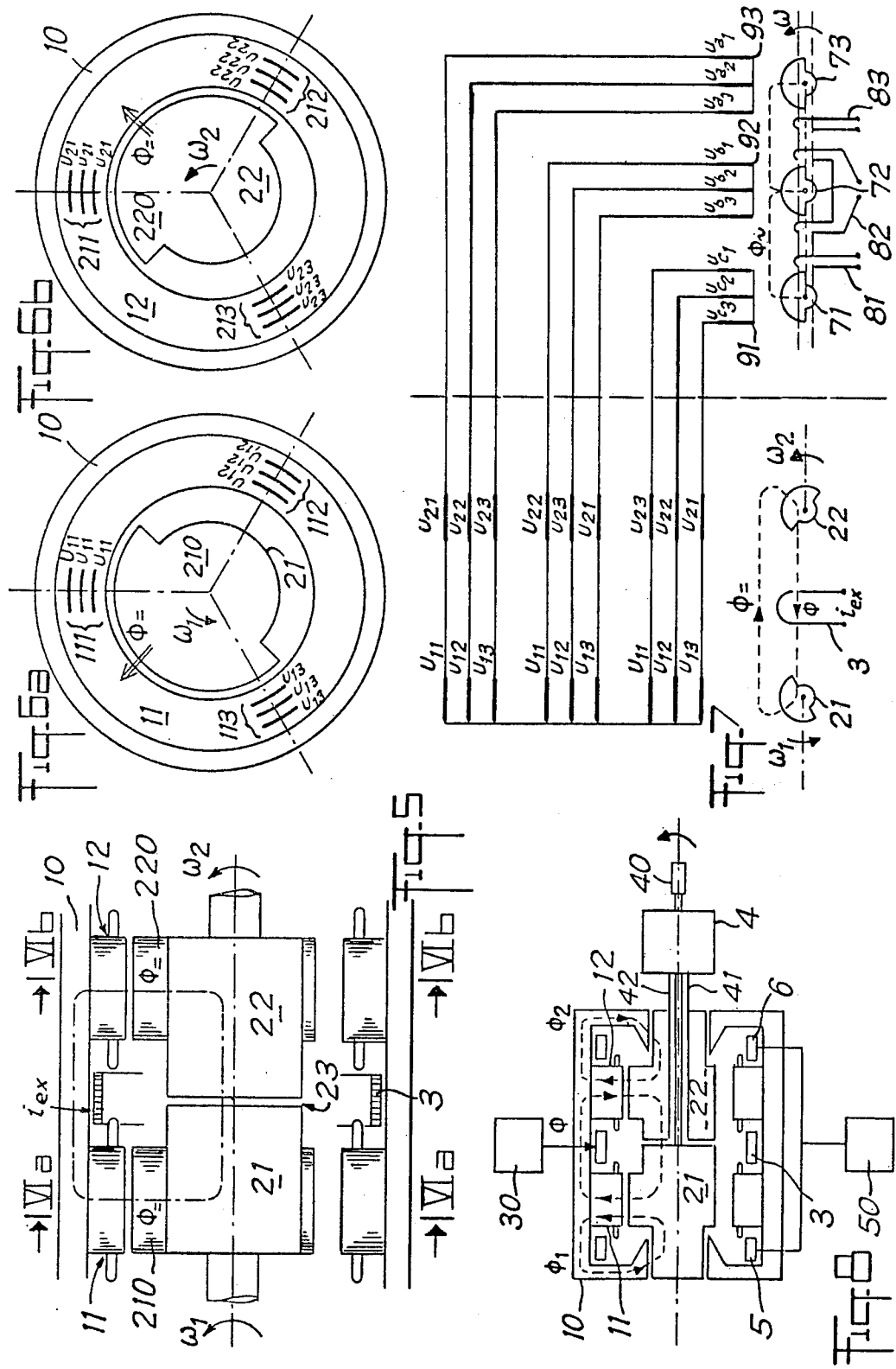

PULSATING SIGNAL GENERATOR FOR THE PRODUCTION OF POLYPHASE VOLTAGES OF INTERFERENCE

BACKGROUND OF THE INVENTION

This invention pertains to a pulsating signal generator for the production of n systems of polyphase voltages with n phases, in which the resulting pseudo-sinusoidal voltages of each of the n systems are modulated in amplitude to a predetermined, fixed or variable, pulsation $\epsilon$, and staggered by $2\pi/n$ among themselves.

The interference between the two sinusoidal voltages of frequency $f_1$, and $f_2$, or pulsations $\omega_1$, and $\omega_2$ (where $\omega_1 = 2\pi f_1$ and $\omega_2 = 2\pi f_2$), and with different amplitudes $U_1$, and $U_2$, is a well known phenomenon, currently used in radio, in the technique of synchroscopes, in transmitters, etc.

This phenonmenon may be summarized by the following equation:

$$U(t) = U_1 \sin \omega_1 t + U_2 \sin \omega_2 t = 2U_o \cos (\epsilon t) \sin (\omega t) + 2e \sin (\epsilon t) \cos (\omega t) \quad (1)$$

in which
$\omega_1 = \omega + \epsilon$
$\omega_2 = \omega - \epsilon$ and
$U_1 = U_o + e$
$U_2 = U_o - e$ with an average pulsation $\epsilon$ and an average voltage of the component sinusoidal voltages $U_o$. The general characteristics of the voltage resulting from the "pulsating" signal $U(t)$ are shown in FIG. 1 by the solid line $C_1$. Of course, if two systems of polyphase voltages are connected in series, phase to phase, n voltages analogous to that of equation (1) are obtained within the same envelope, but staggered by $2\pi/n$ being the number of phases of each system of voltages. FIG. 2 represents the graphs of these voltages which are as follows:

$$U_A = U_1 \sin (\omega_1 t) + U_2 \sin (\omega_2 t) \quad \text{(graph 1)} \quad (2)$$

$$U_B = U_1 \sin (\omega_1 t - \frac{2\pi}{3}) + U_2 \sin (\omega_2 t - \frac{2\pi}{3}) \quad \text{(graph 2)}$$

$$U_C = U_1 \sin (\omega_1 t + \frac{2\pi}{3}) + U_2 \sin (\omega_2 t + \frac{2\pi}{3}) \quad \text{(graph 3)}$$

(Two triphase systems will be considered hereinafter in an example of a generator according to this invention).

Furthermore, if the differential voltage $e = 0$, that is if $U_1 = U_2 = U_o$, the resulting voltage $U(t) = 2U_o \cos \epsilon t \sin \omega t$, may be described as a "pseudo-sinusoidal" voltage of pulsation $\epsilon$, and of variable amplitude $2U_o \cos \epsilon t$. The same is true for the resulting voltages of the two polyphase systems placed in series, phase to phase, and previously described. This latter series polyphase system corresponds to the situation illustrated by the graph FIG. 3a, and described mathematically as follows:

$$U_{a1} = U_o \sin(\omega_1 t) + U_o \sin(\omega_2 t) = U_{11} + U_{21} \quad \text{(graph a}_1\text{)} \quad (3)$$

$$U_{a2} = U_o \sin (\omega_1 t - \frac{2\pi}{3}) + U_o \sin(\omega_2 t - \frac{2\pi}{3}) = U_{12} + U_{22} \quad \text{(graph a}_2\text{)}$$

$$U_{a3} + U_o \sin (\omega_1 t + \frac{2\pi}{3}) + U_o \sin(\omega_2 t + \frac{2\pi}{3}) = U_{13} + U_{23} \quad \text{(graph a}_3\text{)}$$

In addition, circular permutations of the phases of the second polyphase system, in relation to the first one, results in n groups of voltages with a general aspect similar to that of the frist group, but the respective envelopes of which are staggered among themselves. Thus it can be seen in FIG. 3a and the corresponding equation above, and FIGS. 3b, and 3c and their corresponding equations below that there are three groups of $U_a$, $U_b$ and $U_c$ voltages with:

$$U_{b1} = U_o \sin (\omega_1 t) + U_o \sin (\omega_2 t - \frac{2\pi}{3}) = U_{11} + U_{22} \quad \text{(graph b}_1\text{)} \quad (4)$$

$$U_{b2} = U_o \sin (\omega_1 t - \frac{2\pi}{3}) + U_o \sin (\omega_2 t + \frac{2\pi}{3}) = U_{12} + U_{23} \quad \text{(graph b}_2\text{)}$$

$$U_{b3} = U_o \sin (\omega_1 t + \frac{2\pi}{3}) + U_o \sin \omega_2 t = U_{13} + U_{21} \quad \text{(graph b}_3\text{)}$$

$$U_{c1} = U_o \sin \omega_1 t + U_o \sin (\omega_2 t + \frac{2\pi}{3}) = U_{11} + U_{23} \quad \text{(graph c}_1\text{)} \quad (5)$$

$$U_{c2} = U_o \sin (\omega_1 t - \frac{2\pi}{3}) + U_o \sin \omega_2 t = U_{12} + U_{21} \quad \text{(graph c}_2\text{)}$$

$$U_{c3} = U_o \sin (\omega_1 t + \frac{2\pi}{3}) + U_o \sin (\omega_2 t - \frac{2\pi}{3}) U_{13} + U_{22} \quad \text{(graph c}_3\text{)}$$

The vectorial representation of these equations is given on FIGS. 4a, 4b, and 4c, in which the system $U_{11}$, $U_{12}$, and $U_{13}$ rotates at the speed $(\omega t + \epsilon t)$ and the system $U_{21}$, $U_{22}$, and $U_{23}$ rotates at the speed $(\omega t - \epsilon t)$. The resulting voltages $(U_{a1}, U_{a2}, U_{a3})$, $(U_{b1}, U_{b2}, U_{b3})$, and $(U_{c1}, U_{c2}, U_{c3})$ form three "pseudo-triphase" systems of variable amplitudes respectively equal to $U_{Ao} = 2U_o \cos \epsilon t$, $U_{Bo} = 2U_o \cos$ $$(\epsilon t - \frac{2\pi}{3}), \text{ and } U_{Co} = 2U_o \cos (\epsilon t + \frac{2\pi}{3}).$$

This invention has as its primary object to provide a novel appropriate means of utilizing this "pulsating" phenomenon, especially in order to obtain a system of polyphase voltages at a given, constant or variable, frequency, f, and corresponding to the pulsation $\epsilon$ from an electric generator producing voltages responding to the previously described equations (3, 4, 5).

A more specific object of this invention is to provide a novel pulsating signal generator permitting the production of systems of polyphase voltages at n phases responding to n systems of equations of the kinds (3) to (5) above.

It is known that pulsating signal generators of this kind in which two alternators are being used, each with its own frequency. However, this device is costly and cumbersome taking into consideration the need to use two separate rotating machines. This invention aims more particularly at permitting the realization of a pulsating signal generator in a manner altogether simple, economical and efficient. These and other objects of the invention are obtained through a pulsating signal generator which according to the invention, preferably includes a rotating double homopolar machine including a double homopolar stator circuit provided wth two armatures, each including a system of polyphase windings with n independent circuits per phase, each circuit of each phase of the first armature being connected in series with one of the circuits of a phase of the second armature, in such a way as the circuits of the second armature connected in series with the circuits of a same phase of the first armature will all belong to different phases, determined by circular permutations. The pulsating signal generator includes a rotor with a rotating magnet divided into two half-rotors at right angle with an airgap. An induction coil for excitation of the armature is disposed concentric the axis of the rotor in order to produce a magnetic flux in the two armatures. In addition there is provided means for driving the two half-rotors at speeds $\omega_1$, and $\omega_2$ different one from the other and which are such that the half-difference of the speeds ($\omega_1 - \omega_2 /2$) is equal to $\epsilon$.

The generator according to the invention is especially compact since it includes a single frame and a common stator, while it permits a great flexiblity of operation.

According to a particular form of the invention, the half-rotors are driven into rotation by means of a differential device which is itself driven by a single drive.

Another advantageous feature of the generator of one embodiment is the addition of at least one auxiliary excitation coil, concentric to the axis of the rotor and permitting control of the real flux in the two armatures, thereby achieving regulation of the flux and balancing of the rotor. Other characteristics and advantages of the invention will become apparent to one skilled in the art on reading the following detailed description of some specific forms of the invention given only as non-limiting examples with reference to the attached drawings.

BRIEF DESCRIPTION OF THE DRAWINGS

FIG. 1 is a graph representing the voltage corresponding to equation (1);

FIG. 2 is a graph representing the voltages corresponding to equations (2);

FIGS. 3a to 3c are graphs representing the voltages corresponding to equations (3) to (5), respectively;

FIG. 5 is a schematic view of an axial section of a general form of a pulsating signal generator according to the invention;

FIGS. 6a and 6b are sectional views following the lines VIa—VIa, and VIb—VIb of FIG. 5;

FIG. 7 represents schematically a generator according to the invention and used together with a demodulator;

FIG. 8 is a schematic view of a specific form of a generator according to the invention.

DETAILED DESCRIPTION

Figure 4A:
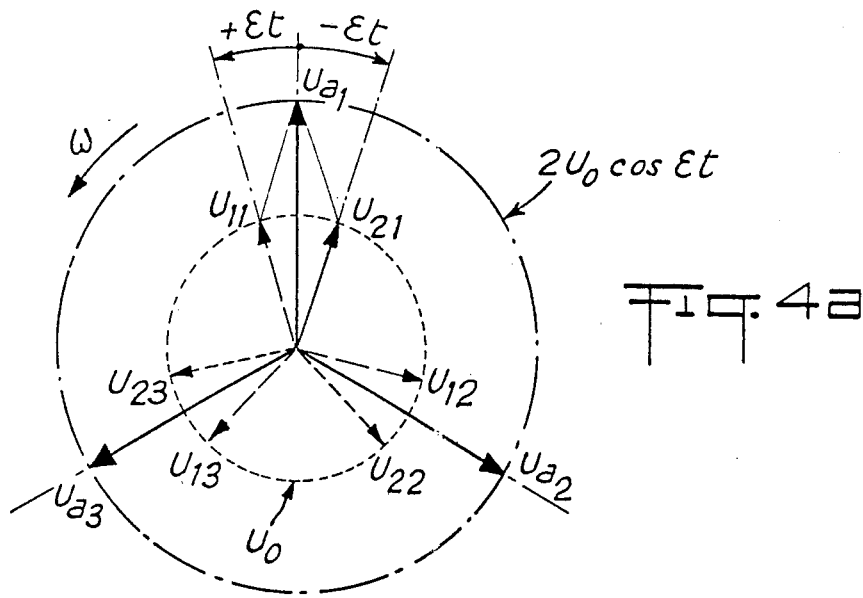
FIGS. 4a to 4c are vectorial representations of the voltages corresponding to the equations (3) to (5), respectively.
Figure 4B:
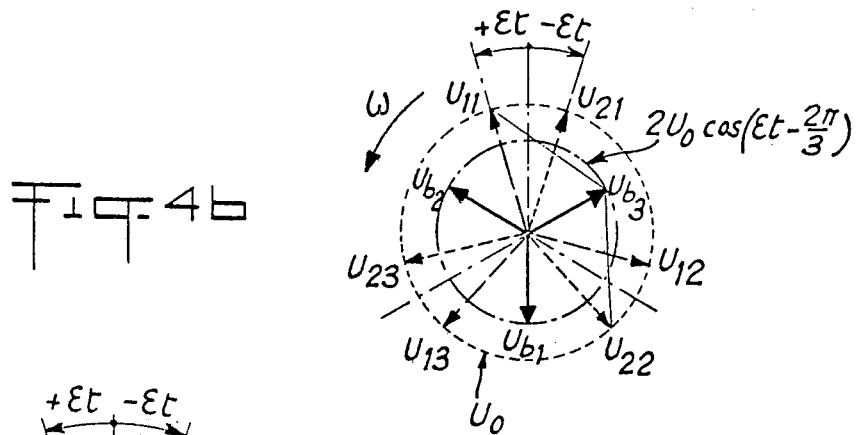
Figure 4C:
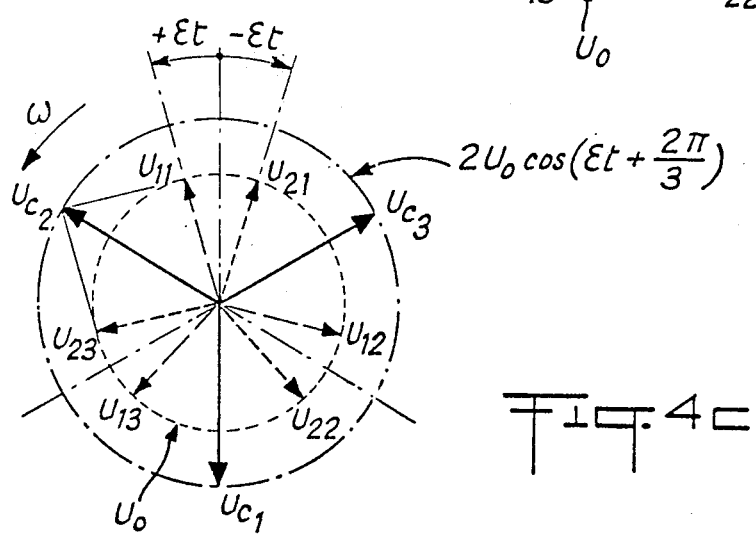

FIG. 5 schematically illustrates one form of a pulsating generator according to the invention. This generator includes a magnetic stator circuit, similar to the one of a double homopolar alternator, which comprises two armatures 11, and 12, connected through a yoke 10. The generator of FIG. 5 includes a double rotor preferably with a rotatable magnet and made up of two pieces or half-rotors 21, and 22, mounted to be driven at different speeds $\omega_1$, and $\omega_2$, respectively. The half-rotors are separated one from the other by an airgap 23, the shape of which may present extremely varied configurations as described hereinafter.

The two half-rotors 21, and 22 are traversed by a same common flux, but due to the fact that the two half-rotors 21, and 22 may be driven at different speeds $\omega_1$, and $\omega_2$, it is possible to generate, within the windings of the corresponding armatures, voltages of different frequencies.

The generator is provided with an induction coil 3, concentric with the axis of the half-rotors 21, and 22 and traversed by an excitating current $i_{ex}$ which leads to the circulation of a magnetic flux $\phi$ common to both armatures 11, and 12.

Of course, the half-rotors 21, and 22, like in any other alternator, may present a number of polar masses 210, 220, variable depending on the applications under consideration. In the drawings, there is shown one embodiment in which each half-rotor 21, and 22 bears only a single polar mass or pole 210, and 220, respectively. However, it is interesting to note that this number of polar masses may be increased and the rotating speeds $\omega_1$, and $\omega_2$ may be varied as will be described below in greater detail.

It can be seen schematically in FIGS. 6a and 6b, that each armature 11, and 12 includes a system of triphase windings with three independent windings or circuits per armature phase as is generally indicated at 111, 112 and 113 for the first armature 11 and 211, 212 and 213 for the second armature 12. The coils of the three independent circuits of the first armature, which each have the same number of equivalent windings, are placed in series each with one of the coils of the three independent circuits of the second armature as shown on the diagram of FIG. 7, where, as may also be seen on FIGS. 6a and 6b, for the first armature 11 each circuit of the first phase is referenced by $u_{11}$, each circuit of the second phase is referenced by $u_{12}$, each circuit of the third phase is referenced by $u_{13}$, and, for the second armature 12 each circuit of the first phase is referenced by $u_{21}$, and, each circuit of the second phase is referenced by $u_{22}$, and each circuit of the third phase is referenced by $u_{23}$. Generally speaking, each winding or circuit of each phase of the first armature 11 is placed in series with one of the circuits of each phase of the second armature 12, so that the circuits of the second armature placed in series with the circuits of the same phase of the first armature will all be associated with different phases, determined by circular permutation.

The voltages at the terminals of the windings $u_{11}$, $u_{12}$, $u_{13}$, $u_{21}$, $u_{22}$, and $u_{23}$ are, respectively, the voltages $U_{11}$, $U_{12}$, $U_{13}$, $U_{21}$, $U_{22}$, and $U_{23}$ previously defined, so that there is obtained at the output three systems of resulting triphase, pseudo-sinusoidal voltages ($U_{a1}$, $U_{a2}$, $U_{a3}$), ($U_{b1}$, $U_{b2}$, $U_{b3}$), and ($U_{c1}$, $U_{c2}$, $U_{c3}$) corresponding to the previously mentioned equations (3) to (5).

These three systems of triphase pseudo-sinusoidal voltages, the amplitudes of which are equal to $U_{Ao}$, $U_{Bo}$, and $U_{Co}$, may directly feed a demodulator such as, for example, the demodulator described and claimed in United States patent application Ser. No. 33,957 filed concurrently herewith (corresponding to application French Pat. No. 78.12835 filed on Apr. 28, 1978) under the name of the same Applicant, and entitled "Demodulator of Polyphase Voltages Interfering Among Themselves". The disclosure of the aforementioned U.S. patent application is hereby incorporated herein by reference.

It will be appreciated that by means of such a demodulator, shown schematically in the lower right-hand portion of FIG. 7, it is possible to obtain a system of triphase output voltages $U_{Ao}$, $U_{Bo}$, and $U_{Co}$ at a pulsation $\epsilon$ [see equation (6)]. It can be seen in FIG. 7 that these voltages $U_{Ao}$, $U_{Bo}$, and $U_{Co}$, in the case of a rotating demodulator such as the one described in the above mentioned application for patent, are collected at the terminals of the static coils 81, 82, and 83, respectively, which are concentric with a rotor 70 freely rotating at the speed and provided with the magnetic circuits 71, 72, and 73 disposed adjacent to respective armatures 91, 92, and 93 and to which the above mentioned systems of triphase pseudo-sinusoidal voltages are applied. Of course, from these systems of triphase pseudo-sinusoidal voltages, one may obtain triphase voltages $U_{Ao}$, $U_{Bo}$, and $U_{Co}$, by means of different kinds of demodulators.

The half-rotors 21, and 22 of the pulsating signal generator, according to the invention, may be driven by two independent motors rotating at different speeds $\omega_1$, and $\omega_2$. Therefore, in order for the voltages induced in the different coils of the two armatures 11, and 12, traversed by the same flux, to have the same amplitude ($U_1 = U_2 = U_3$), the ratio $n_1/n_2$ of the number of equivalent windings for the first and second armatures must be equal to the inverse ratio $\omega_1/\omega_2$ of the driving speeds of the first and second half-rotors.

This equality is true only for a single value of the ratio of speeds, since the number of equivalent windings is a function of machine construction. Thus, when the ratio $\omega_1/\omega_2$ is different from the optimal value $n_2/n_1$, the amplitudes $U_1$ and $U_2$ of the two systems of compound voltages are no longer equal and the resulting voltages include a term of error of the form $2e \sin(\epsilon t) \cos(\omega t)$, as it appears in the equation (1), with $e = (U_1 - U_2/2)$.

It is clearly apparent that the term of error is smaller when the ratio $\omega_1/\omega_2$ is itself little variable in relation to the pulsation of modulation wanted $=(\omega_1 - \omega_2/2)$; that is, when the ratio average $\epsilon$/average $\omega$ is itself small. Accordingly, it is desirable in order to minimize the error signal to increase, as much as possible, the driving speeds $\omega_1$ and $\omega_2$ of the two half-rotors, as well as the number of their polar masses 210, and 220. This is especially easy to realize with the double rotor of the kind with a rotating magnet as is incorporated in the pulsating generator according to the invention.

In the machine described with reference to FIG. 5, there appears only one induction coil 3, concentric with the rotor shaft, traversed by an excitation current $i_{ex}$, and, therefore, leading to the circulation of a single flux common to both armatures.

Referring back to FIG. 8, it can be seen that it is possible to associate with the coil 3 two auxiliary lateral coils of excitation, 5 and 6, also concentric with the rotor shaft. The coils 5 and 6 produce two auxiliary flux $\phi_1$, and $\phi_2$ which superpose themselves on the common flux $\phi$ in both armatures 11 and 12. By properly controlling the current circulating through these two auxiliary coils 5 and 6, it is therefore possible to control the flux going through each armature and to keep it around an average value of equilibrium. Further, the two half-rotors 21 and 22 may be driven by means of a single drive 40 which drives the half-rotor at different speeds through a differential device 4, as shown in FIG. 8. In this case, the speeds of the two half-rotors 21 and 22 are governed by the classical laws of mechanics, and it is possible to control their values by acting against the resisting, electro-magnetic couple affecting each rotor, the motor couples acting on these resisting couples being in a constant relation which is function of the gear relations of the differential. The resisting electro-magnetic couple acting on each half-rotor 21 and 22 is proportional to the total flux going through the half-rotor, since the coils are traversed by the same current and since the power factor is identical for the two half-machines ($C = \phi I \cos \phi$). Thus, when a regulator 50 of an output frequency corresponding to the pulsation $\epsilon$ provides excitation current convenient for both auxiliary lateral excitation coils 5 and 6, it is possible to obtain an output frequency $f = (\epsilon/2\pi)$ in accordance with a given program: for example, constant frequency for a variable driving speed, or, on the contrary, variable frequency for a constant driving speed. Further, the central excitation coil 3 may also be associated with a regulator 30 of voltage of output, capable of subjecting the output of a demodulator placed at the output, of a pulsating signal generator to any voltage/frequency program desired.

Figure 9:
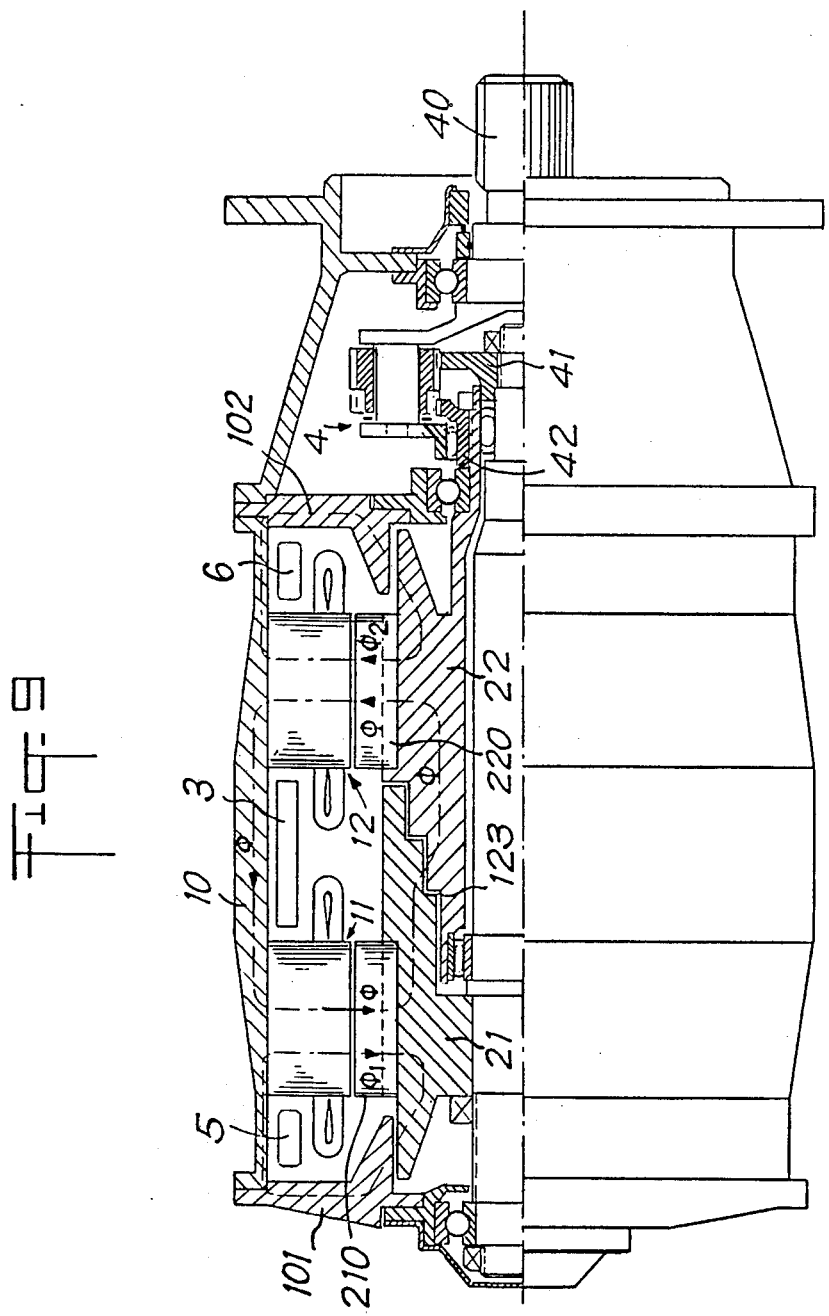
FIGS. 9 and 10 represent partial views of an axial section of specific forms of generators according to the invention.

An example of one embodiment of a pulsating signal generator driven through a differential device 4 by means of a single drive 40, and equipped with a main coil of excitation 3 and of two auxiliary excitation coils 5 and 6, is shown in FIG. 9. Each half-rotor 21 and 22 is driven by the gears 41 and 42 of the differential 4, which is itself driven by means of the single drive 40.

Figure 10:
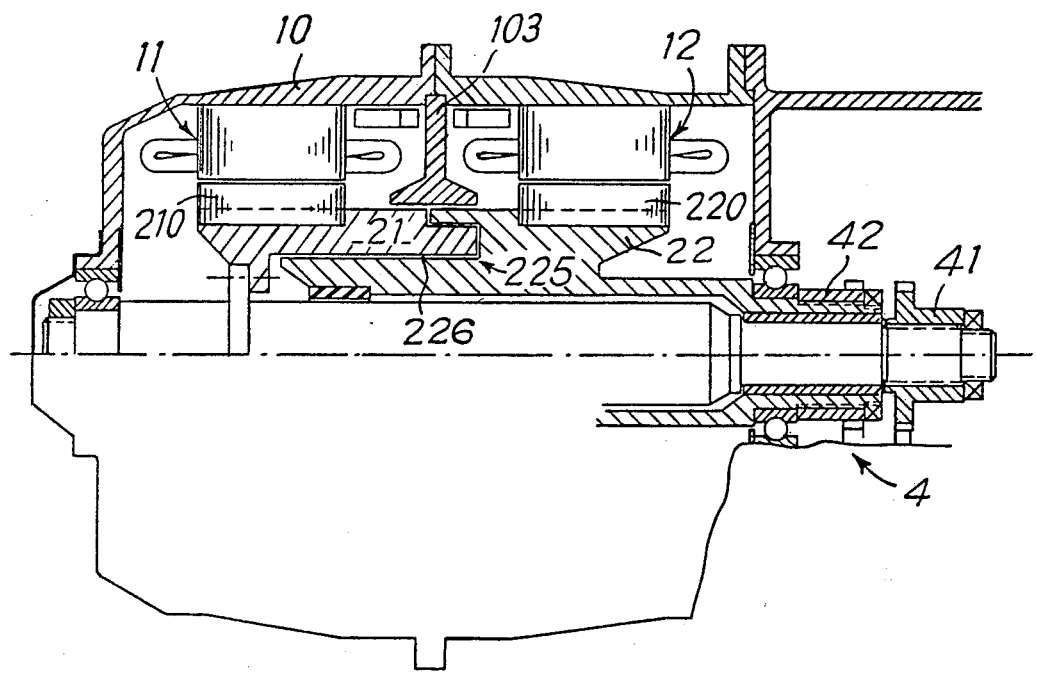

In FIG. 9, there is also shown an example of configuration of the airgap 123 between the two half-rotors 21 and 22. This staircase-step shaped airgap, of course, is not the only configuration possible. Thus, in FIG. 10 there is shown an alternative embodiment in which the median airgap 225 has a relatively long, horizontal rectilinear part 226.

Of course, numerous variations may be appreciated by those skilled in the art to the foregoing embodiments which have been described only as examples. Thus, for example, as shown on FIG. 10, the parts of the magnetic circuit referenced by 101, 102 in FIG. 9, and permitting the flux to close itself at the frontal ends of the machine between the longitudinal yoke 10 and the double rotor 21, 22, could be replaced by a radial central part 103 attached to the yoke 10 between the armatures 11 and 12 and coming in front of the double rotor at the level of the airgap 225 of separation of the two half-rotors 21 and 22.

It will also be apparent to one skilled in the art that the locations of the various coils and/or their means of connection may also be varied without departing from the essential characteristics of the invention as set forth hereinafter in the claims. Moreover, it is possible to use various techniques of regulation for the regulators of frequency 50 and of voltage 30. The nature of the differential 4, its location, the use of multiplicators, integrated or not, may also be chosen depending on the applications under consideration.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A pulsating signal operator for the production of n systems of polyphase voltages at n phases, where the resulting pseudo-sinusoidal voltages from each of the n systems are modulated in amplitude to a predetermined, fixed or variable, pulsation $\epsilon$, and staggered between themselves by $(2\pi/n)$, the generator comprising a double rotating homopolar including:

(a) a magnetic stator circuit provided with two armatures, each armature including a system of polyphase windings with n independent circuits per phase, each circuit of each phase of the first armature being connected in series with one of the circuits of a phase of the second armature in such a way that the circuits of the second armature connected in series with the circuits of a same phase of the first armature all belong to different phases, determined by circular permutations;

(b) a rotor with a rotatable magnet separated into two half-rotors by an airgap;

(c) an excitation coil concentric with the axis of the rotor for inducing a magnetic flux in the two armatures; and, (d) means for driving the two half-rotors at speeds $\omega_1$ and $\omega_2$, different one from the other and such that the half-difference of the speeds $(\omega_1 - \omega_2/2)$ is equal to the pulsation $\epsilon$.

2. A pulsating signal generator according to claim 1, in which the driving means comprises a mechanical differential coupled to the respective half-rotors and driven by a single drive.

3. A pulsating signal generator according to claim 1 including at least one auxiliary excitation coil concentric with the axis of the rotor for controlling the magnetic flux in the two armatures in order to achieve regulation of said flux.

4. A pulsating signal generator according to claim 2 including at least one auxiliary excitation coil concentric with the axis of the rotor for controlling the magnetic flux in the two armatures in order to achieve regulation of said flux.

5. A pulsating generator according to claim 1 in which the excitation coil is supplied with an excitation current from an output voltage regulator.

6. A pulsating signal generator according to claim 4 in which the excitation coil is supplied with an excitation current from an output voltage regulator.

7. A pulsating signal generator according to claim 1 in which the stator includes a centrally disposed magnetic member located between the two armatures and adjacent each of the half-rotors in the vicinity of the air gaps.

8. A pulsating signal generator, according to claim 1, in which the number of phases n is equal to 3.

9. A pulsating signal generator according to claim 3 in which the stator includes a centrally disposed magnetic member located between the two armatures and adjacent each of the half-rotors in the vicinity of the air gaps.

10. A pulsating signal generator according to claim 5 in which the stator includes a centrally disposed magnetic member located between the two armatures and adjacent each of the half-rotors in the vicinity of the air gaps.

11. A pulsating signal generator according to claim 2, in which the number of phases n is equal to 3.

12. A pulsating signal generator according to claim 7, in which the number of phases n is equal to 3.

* * * * *